US007680119B2

United States Patent
Kynast et al.

(10) Patent No.: US 7,680,119 B2
(45) Date of Patent: Mar. 16, 2010

(54) MAIN STATION AND SUBSTATION IN A NETWORK AND A METHOD FOR TRANSMITTING DATA IN A NETWORK

(75) Inventors: Rigobert Kynast, Lohr am Main (DE); Ludwig Leurs, Lohr am Main (DE); Thomas Schmid, Hafenlohr (DE); Stephan Schultze, Lohr am Main (DE)

(73) Assignee: Bosch Rexroth AG, Stuttgart (DE)

( * ) Notice: Subject to any disclaimer, the term of this patent is extended or adjusted under 35 U.S.C. 154(b) by 726 days.

(21) Appl. No.: 11/208,219

(22) Filed: Aug. 19, 2005

(65) Prior Publication Data
US 2006/0045119 A1 Mar. 2, 2006

(30) Foreign Application Priority Data
Aug. 24, 2004 (DE) .................... 10 2004 041 093

(51) Int. Cl.
*H04L 12/28* (2006.01)
(52) U.S. Cl. .............. 370/395.1; 370/452; 714/733
(58) Field of Classification Search .......... 370/452, 370/460, 395; 714/733, 719
See application file for complete search history.

(56) References Cited

U.S. PATENT DOCUMENTS

| 4,002,842 | A | | 1/1977 | Meyr et al. |
| 5,412,756 | A | * | 5/1995 | Bauman et al. ............... 706/45 |
| 5,896,384 | A | | 4/1999 | Erickson |
| 6,496,516 | B1 | | 12/2002 | Dabecki et al. |
| 6,530,052 | B1 | * | 3/2003 | Khou et al. ................ 714/733 |
| 2002/0035671 | A1 | * | 3/2002 | Kametani et al. ........... 711/118 |
| 2005/0198238 | A1 | * | 9/2005 | Sim et al. .................. 709/222 |

* cited by examiner

*Primary Examiner*—Dang T Ton
*Assistant Examiner*—Wei Zhao
(74) *Attorney, Agent, or Firm*—Michael J. Striker

(57) ABSTRACT

A network station for a data network for receiving external data and for transmitting device-internally prepared data has a repeater for transmitting an external data packet received at a data input to a data output, a first data preparation unit for transmitting an internal data packet generated from the prepared data via the data output, having a switching device for interrupting the data path between the data input and the data output, a control unit that is connected to the switching device in order, in a first operating mode, to block the transmission of the received external data packet via the data output if the internal data packet is currently being transmitted via the data output by the data preparation unit, and to permit the transmission of the received data packet by the repeater via the data output if no internal data packet is currently being transmitted via the first data preparation unit.

6 Claims, 5 Drawing Sheets

MAIN STATION AND SUBSTATION IN A NETWORK AND A METHOD FOR TRANSMITTING DATA IN A NETWORK

BACKGROUND OF THE INVENTION

The present invention relates to a main station and a substation in a network, e.g. in a field bus network, and in particular the reception of external data and for the transmission of device-internally prepared data via the network. The invention also relates to a method for transmitting data in a network.

Data networks, for example a field bus network, usually have a main station and one or more substations that are connected to one another by means of point-to-point connections. The main station and the substation constitute a ring network in which the main station is connected via a unidirectional network connection to a data input of the first substation, a data output of the first substation is connected to a data input of a second substation, a data output of the second substation is connected to a data input of a third substation, etc. The data output of the last substation is connected to a data input of the main station.

Alternatively, a linear network topology can also be provided in which the main station and the substations are connected to each other via network connections that have two channels for the send and receive directions.

A hallmark of data networks is that the data received in the substations are relayed via a repeater. The time at which the relay occurs in relation to the reception can be delayed as needed and the received data can be entirely or partially prepared for further processing and evaluation in the substation. For example, the data can be transmitted in data packets.

The communication on a data network comprised in this way can occur, for example, randomly, i.e. the communication time at which a station transmits a data packet via its data output to the data network is not fixed ahead of time. For example, each station can send the data packet via its data output at any time. In an IP network protocol (IP=Internet protocol) of this kind, since the substations of the network as a rule transmit data packets arriving at their data input immediately to the data output via the repeater, at the beginning of the transmission of a data packet, overlaps of two data packets can occur if an external data packet is received during the transmission. This external data packet can no longer be interpreted by a subsequent network subscriber.

In data networks, it is also possible to provide two or more communication channels in time domains that are reserved for them. In addition to the above-described IP communication channel, it is also possible to provide a time domain that is referred to as a real-time channel, on which data packets are transmitted in a systematic sequence; a chronologically defined time window in at least one of the data packets is associated with a respective substation so that the substation can read the respective data associated with it from the data packet.

A time window is also reserved for the substation in another data packet and the substation can insert data into this time window while the substation is forwarding the received data packet to its data output.

Particularly in the IP communication channel, the problem arises that two overlapping data packets become unusable and thus hinder data communication on the data network.

SUMMARY OF THE INVENTION

Accordingly, it is an object of the present invention to provide a main station and a substation in a network and a method for transmitting data in a network, which avoid the disadvantages of the prior art.

In keeping with these objects and with others, one feature of the present invention resides, briefly stated, in a method for receiving external data packets and for transmitting device-internally prepared data in a data network, comprising the steps defining a first operating mode which includes transmitting of a received external data packet to a data output; preparating an internal data packet that includes the device-internally prepared data; transmitting the prepared internal data packet via a data output; and blocking the transmitting a data packet received from the data network to the data output if the prepared internal data packet is currently being transmitted to the data network.

Another feature of the present invention resides, briefly stated, in a network station for a data network for receiving external data and for transmitting device-internally prepared data, comprising a repeater for transmitting an external data packet received at a data input to a data output; a first data preparation unit for transmitting an internal data packet generated from the prepared data via the data output; having a switching device for interrupting the data path between the data input and the data output; a control unit that is connected to the switching device in order, in a first operating mode, to block the transmission of the received external data packet via the data output if the internal data packet is currently being transmitted via the data output by the data preparation unit, and to permit the transmission of the received data packet by the repeater via the data output if no internal data packet is currently being transmitted via the first data preparation unit.

According to a first embodiment of the present invention, a network station for a data network is provided for receiving external data and for sending device-internally prepared data via the network. The network station has a repeater for transmitting an external data packet received at the data input to a data output. With the aid of a first data preparation unit, an internal data packet generated from the prepared data is transmitted via the data output. A switching device can be used to interrupt the data path between the data input and the data output. A control unit is connected to the switching device in order, in a first operating mode, to block the transmission of the received external data packet via the data output if the internal data packet is currently being transmitted by the data transmission unit. The transmission of the received external data packet by the repeater via the data output is permitted if no data packet is currently being transmitted via the first data preparation unit.

This assures that in an IP communication, i.e. in a random communication of each of the network stations via the data network, if the network station is in the process of transmitting an internal data packet, then the received external data packet will not be forwarded. During the transmission of the internal data packet with the prepared data, this prevents an overlapping of external and internal data packets, which would cause the data contained therein to become unreadable.

The present invention thus relates to a switched data network; in this context, the term switched means that a switching device according to the invention and the method according to the invention are able to switch, i.e. open and interrupt or block, the data path between the respective data input and data output, as described above.

Particularly in connection with the Ethernet network standard (protocol, network topology, and hardware), known embodiments include switched data networks (switched Ethernet) and networks with amplifiers (repeaters); the switched Ethernet technology is also referred to as a switched data network, but differs from a data network that is switched in accordance with the present invention.

In particular, the present invention can provide a real-time capable data network based on the Ethernet standard—in particular also for data networks with repeaters that do not currently have a switching function in accordance with switched Ethernet (in this case, the present invention offers the advantage that the favorable, rapid repeaters can be used, but the overlapping of packets can be reliably prevented).

According to another embodiment form of the present invention, the control unit can control the switching device so that in the first operating mode, the transmission of the received external data packet via the data output with the aid of the repeater is blocked until the received external data packet has finished arriving. This has the advantage that after the first data transmission unit has transmitted the internal data packet, it does not add a part of a received external data packet, which a receiver would be unable to interpret due to its incompleteness. In other words, the received external data packet is not transmitted via the repeater to the data output until the arrival of this data packet at the data input has finished. Only then can the data input be coupled via the repeater to the data output so that subsequently received external data packets can be forwarded once again via the repeater.

According to another embodiment form of the present invention, the control unit functions cyclically, in a first operating mode during a first time interval and in a second operating mode during a second time interval. A second data preparation unit for transmitting prepared data is provided. The control unit is connected to the switching device in order, in the second operating mode, to connect the data output to the repeater and the second data preparation unit in alternating fashion so that a part of a particular external data packet received at the data input is transmitted by the repeater to the data output and the prepared data are inserted into the data packet at a chronologically defined position of the defined data packet associated with the network station. This makes it possible for the network station to be used in a data network that has two chronologically defined communication channels. An IP communication channel is provided in the operating mode in which an external data packet arriving at a data input is not forwarded if an internal data packet containing data prepared in the network device is currently being transmitted.

A test data unit can be provided in order, at least in the second operating mode, to obtain the received external data packet from the input connection and the prepared data from the second data transmission unit and to generate a test datum; the control unit triggers the switching device so that the test datum is added to the received data packet at another chronologically defined position of the received data packet.

According to another embodiment of the present invention, a method is provided for receiving external data and for transmitting device-internally prepared data in a data network. In a first operating mode, the method includes the following steps: preparation of an internal data packet that contains the device-internally prepared data, transmission of the internal data packet via a data output, and blocking of the transmission of an external data packet received via the data network if the prepared internal data packet is currently being transmitted to the data network.

It is also possible for the transmission of the received external data packet to the data network after the end of the transmission of the prepared internal data packet to be blocked until the received external data packet has finished arriving. It is thus possible to prevent the forwarding into the data network of only a tail end of a received external data packet, which would under certain circumstances be incorrectly interpreted by a network station.

According to another embodiment form of the present invention, the first operating mode can be used during a first time interval and a second operating mode can be used during a second time interval. In this case, the first operating mode is constituted by an IP communication channel and the second operating mode is constituted by a real-time communication channel. The second operating mode includes the following steps: transmission of a part of a defined received data packet via the data network and insertion of the prepared internal data into the defined data packet at a chronologically defined position. In this manner, the prepared data can be inserted into a time window of a predetermined data packet in the real-time communication channel, as a result of which, the received data packet is filled with data that are transmitted via the data network. The second operating mode can also include execution of the following steps: establishment of a test datum based on the defined received external data packet and the prepared data and insertion of the test datum into the received external data packet at another chronologically defined position.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1A:
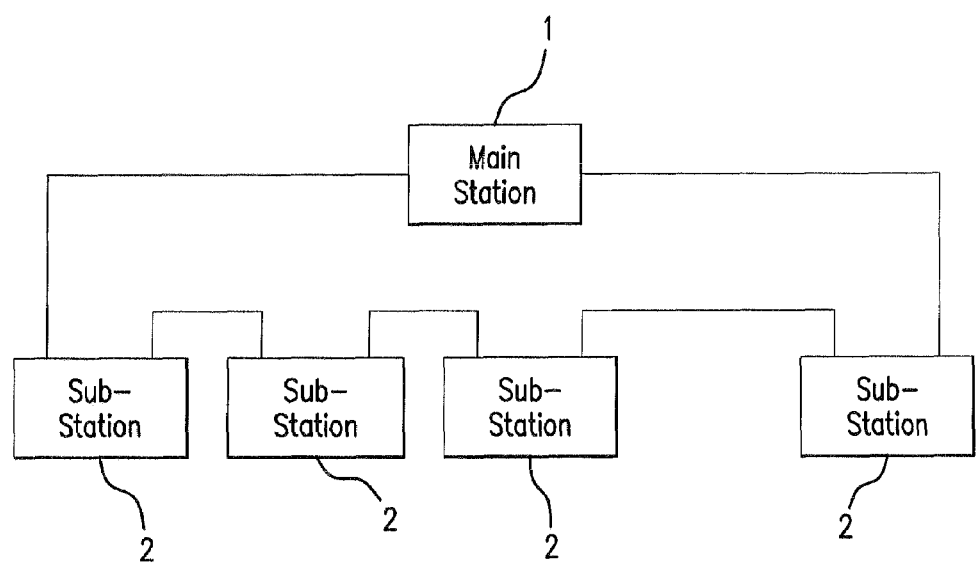
FIGS. 1a and 1b show two possible network topologies for a network having a main station and several substations.
Figure 1B:
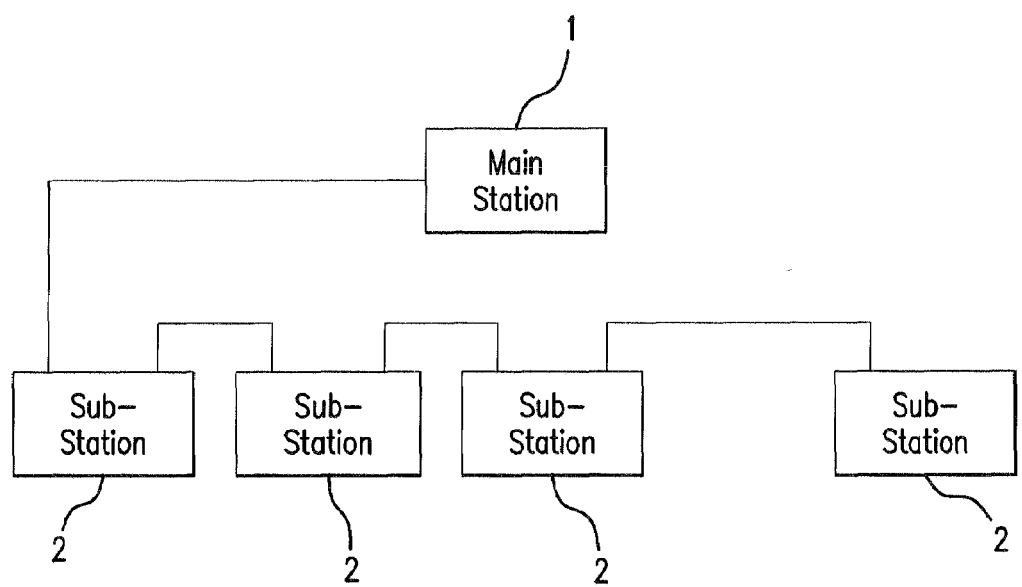

FIGS. 1a and 1b show two possible network topologies for a data network, e.g. for a field bus network. In the network topology shown in FIG. 1a, a main station 1 communicates with substations 2 via point-to-point connections; the main station 1 is connected via a data connection to a data input of a first substation, a data output of the first substation is connected to a data input of a second substation, a data output of the second substation is connected to a data input of a third substation, etc. The data output of the last substation is connected to a data input of the main station 1, thus forming a ring network. A datum transmitted from the main station 1 is received by the first substation 2 and forwarded via its data output to the next substation until the last substation sends the data packet back to the main station 1. The relaying of a data packet received at a data input of a substation 2 usually occurs via repeaters (not shown) in the respective substation 2.

FIG. 1b shows an alternative network architecture. In it, the main station 1 and the substations 2 are situated in a line; with regard to the main station 1, the substations are each able to communicate bidirectionally with the preceding substation 2 and with the subsequent substation 2. A datum, which a substation 2 receives from the substation preceding it, for example, is then forwarded to the subsequent substation and vice versa, likewise via a repeater.

Figure 2:
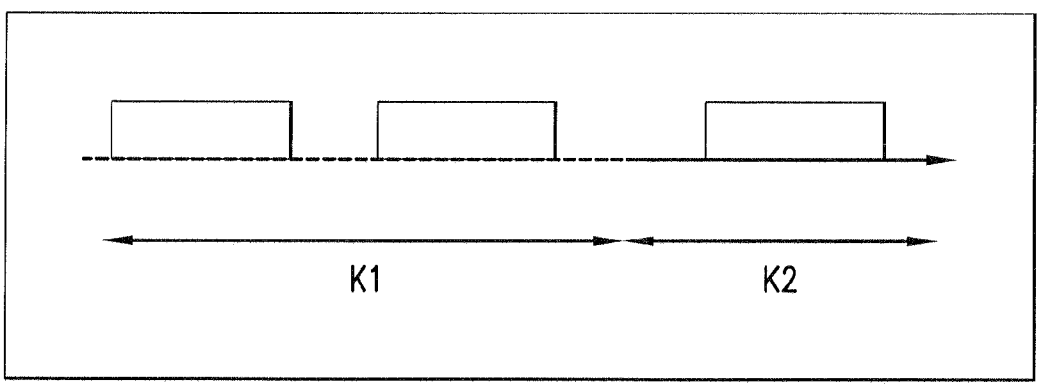
FIG. 2 shows the structure of the data packets transmitted on the network in two chronologically separate communication channels.

One possible communication protocol includes the transmission of data packets in chronologically defined channels. As shown in FIG. 2, a communication cycle has a first channel K1 that is a real-time communication channel and a second channel K2 that is an IP communication channel. The real-time communication channel and the IP communication channel are activated one after the other in sequential alternation in the form of a second and first operating mode of the main station 1 and substations 2 of the network thus constructed.

While the real-time communication channel is active, the main station 1 transmits data packets that contain corresponding data associated with the respective substation 2 within time windows respectively associated with the corresponding substation 2. In at least one of the data packets that the main station transmits, it is possible for each of the substations 2 to insert data into a respective time window that is reserved for it and associated with it, and thus to change the data packet as part of the relaying process. The main station 1 receives the modified data packet and then evaluates the modified data packet received from the substations 2 and, by associating the data contained in the respective time window with the respective substation 2, can receive the corresponding data from the substation 2.

In the IP communication channel, the network stations can essentially communicate with one another randomly. Each of the network stations can transmit a data packet with data to be sent if the respective network station is not currently receiving a data packet at its data input. In the IP communication channel, the substations 2 are usually connected so that basically, an external data packet arriving at the data input is amplified by a repeater and transmitted to the data output. In addition, while the real-time communication channel is active, data are inserted into the data packet transmitted by the repeater, but without temporarily storing or otherwise delaying the received external data packet that is to be forwarded. In certain circumstances, such a setting while the IP communication channel is active results in invalid data. To be precise, after a substation 2 has begun to transmit the internal data packet with the prepared data, if an external data packet is received at the data input of the substation 2, then the received external data packet is transmitted at the data output of the respective substation 2 at the same time as the internal data packet with the prepared data.

According to the present invention, this phenomenon is avoided in that after the substation 2 has started to transmit the internal data packet with the prepared data, the forwarding of an external data packet received via the input of the substation 2 is prevented. Preferably, the forwarding of the external data packet continues to be blocked until the received external data packet has finished arriving so that the substations 2 are once more able to properly forward a subsequent external data packet. This has the advantage that after the data packet prepared internally in the respective substation 2 has been completely transmitted, no remainder or tail end of the received external data packet is forwarded to the data output, which would have resulted in the arrival of invalid data at the subsequent network station.

Figure 3:
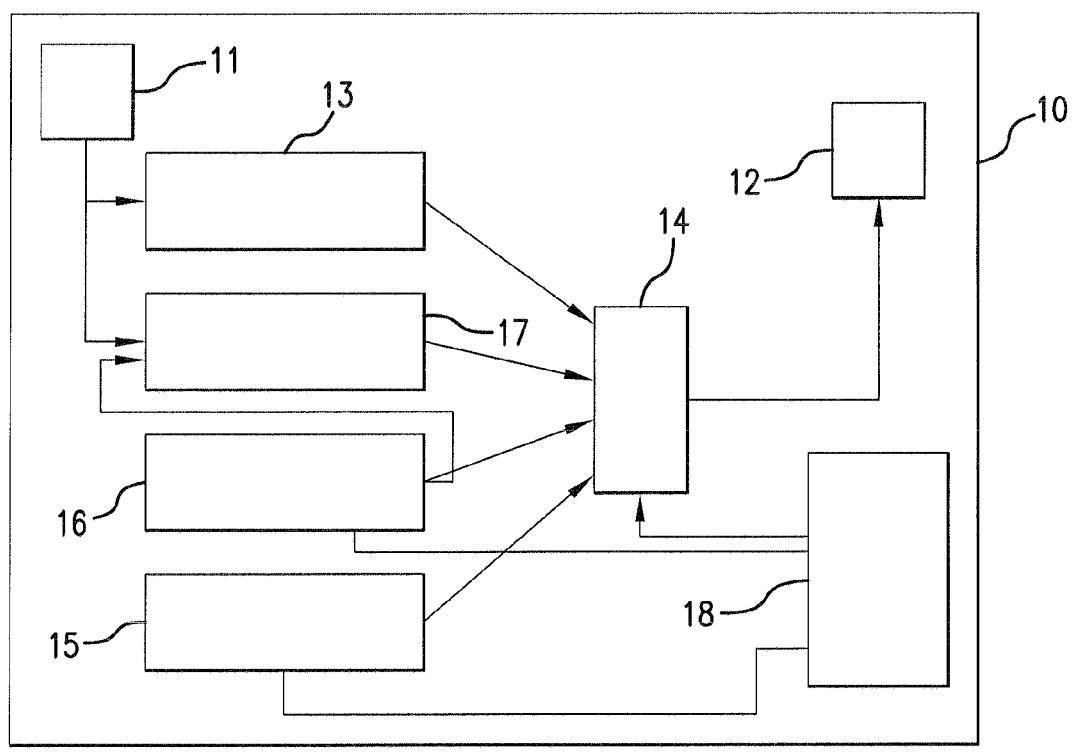
FIG. 3 is a block circuit diagram of a network device according to the present invention.

FIG. 3 shows an example of a network station for building a ring-shaped network topology of the kind depicted in FIG. 1a. The network station 10 has a data input interface 11 via which data can be received from the data network. A data output interface 12 is also provided, via which data can be transmitted into the data network, to the next network station. The data input interface 11 is connected to a repeater 13 that amplifies the received external data and forwards it to a first input of a multiplexer 14. A first data preparation unit 15 and a second data preparation unit 16 are also provided.

The first data preparation unit 15 is embodied so that it constructs an internal data packet out of the prepared data while the IP communication channel is active, i.e. during the time window in which the network subscribers can transmit data packets freely. The second data preparation unit 16 supplies the prepared data in a form in which, while the real-time communication channel is active, the data can be inserted during a time slot into an external data packet received at the data input interface 11. An output of the second data preparation unit 16 is connected to both a third input of the multiplexer 14 and a first input of a test data generating unit 17. A second input of the test data generating unit 17 is connected to the data input interface 11. Since each data packet must include a test datum in order to test for errors in the data contained therein after reception, the test data generating unit 17 calculates a new test datum based on the external data received at the data input interface 11 and the data to be inserted, and transmits the test datum to a second input of the multiplexer 14.

The multiplexer 14, the first data preparation unit 15, and the second data preparation unit 16 are connected to a control unit 18 that assumes control of the communication cycle. If the network device 10 is in the first operating mode, i.e. within the time domain of the IP communication channel, then the multiplexer 14 is switched so that data packets received at the data input interface 11 are forwarded via the repeater 13 to the data output interface 12. If the network station 10 contains internal data that are to be transmitted via the data network, then the prepared data are conveyed to the first data preparation unit 15 that constructs an internal data packet out of the prepared data. As long as the network or network device 10 is in the first operating mode, the control unit 18 first checks whether the data input interface 11 is currently receiving a data packet. If no data packet is currently being received by the data input interface 11, then the control unit 18 triggers the first data preparation unit 15 to transmit the internal data packet comprised of the prepared data to the multiplexer 14. Essentially at the same time as this, the multiplexer 14 is switched so that the first data preparation unit 15 is connected to the data output interface 12. If, during the transmission of the data packet by the first data preparation unit 15, a data packet is received at the data input interface 11, then the control unit 18 triggers the repeater 13 so that it does not forward the received data packet, but rejects it.

After the end of the transmission of the internal data packet by means of the first data preparation unit 15, the control unit switches the multiplexer 14 so that the repeater 13 once again communicates with the data output interface 12. Since it is now possible that a tail end of a data packet received via the data input interface 11 might be forwarded to the data output interface 12 via the repeater 13 and the multiplexer 14, the control unit 18 can initially embody the multiplexer 14 so that the first data preparation unit 15 remains in communication with the data output interface 12. This has the advantage that the network station 10 would not transmit a tail end of a data packet that would be impossible for another network subscriber to interpret. But after the transmission of the internal data packet prepared by the first data preparation unit 15 and the reception of the data packet via the data input interface 11 have finished, the control unit 18 switches the multiplexer 14 so that the output of the repeater 13 communicates with the data output interface 12. It is thus possible for subsequently received data packets to be forwarded from the data input interface 11 to the data output interface 12. If an internal data packet comprised of the prepared data was transmitted while the IP communication channel was active, and the control unit 18 then determines that a remainder of an external data packet is being received via the data input interface 11, then the control unit 18 triggers the first data preparation unit 15 so that so-called idle signals are transmitted.

In the second operating mode, i.e. during the time domain in which data are transmitted via the real-time communication channel, the control unit 18 switches between a first, second, and third input of the multiplexer 14 during a data packet. Usually, one or more first data packets, which the main station 1 uses to transmit data to the substations 2, are transmitted first during the active phase of the real-time communication channel. These data packets contain several time windows, which the data for the respective substation 2 associated with the time window are contained. In one or more second data packets, the main station 1 sends only placeholding data into which the substations 2 can insert data; each substation 2 is associated with a particular time window, i.e. a predetermined position in the data packet. During the active phase of the real-time communication channel, the multiplexer 14 is initially triggered so that the repeater 13 communicates with the data output interface 12.

During reception of one of the first data packets, the repeater 13 analyzes the received data and under certain circumstances, makes the data obtained from the first data packet available to the network station. Even during reception of the second data packet of the real-time communication channel, the repeater 13 initially remains in communication with the data output interface 12 until the time at which the time window associated with the respective network station 10 begins. The multiplexer 14 is then switched so that the second data preparation unit 16 communicates with the data output interface 12 and can insert the prepared internal data into the external data packet during the time window. After transmission of the internal data prepared by the second data preparation unit 16, the control unit switches the multiplexer 14 back again so that the repeater 13 transmits the remaining data of the external second data packet to the data output interface 12.

The second data preparation unit 16 also supplies the prepared data to the test data generating unit 17, which likewise receives the second data packet. The test data generating unit generates test data that are added to the second data packet. To that end, at a corresponding time position of the data packet, the control unit 18 switches the multiplexer 14 so that the test data generating unit 17 communicates with the data output interface 12 via the multiplexer 14. Then the test datum is transmitted and the control unit then switches the multiplexer 14 so that the repeater 13 once again communicates with the data output interface 12.

Figure 4:
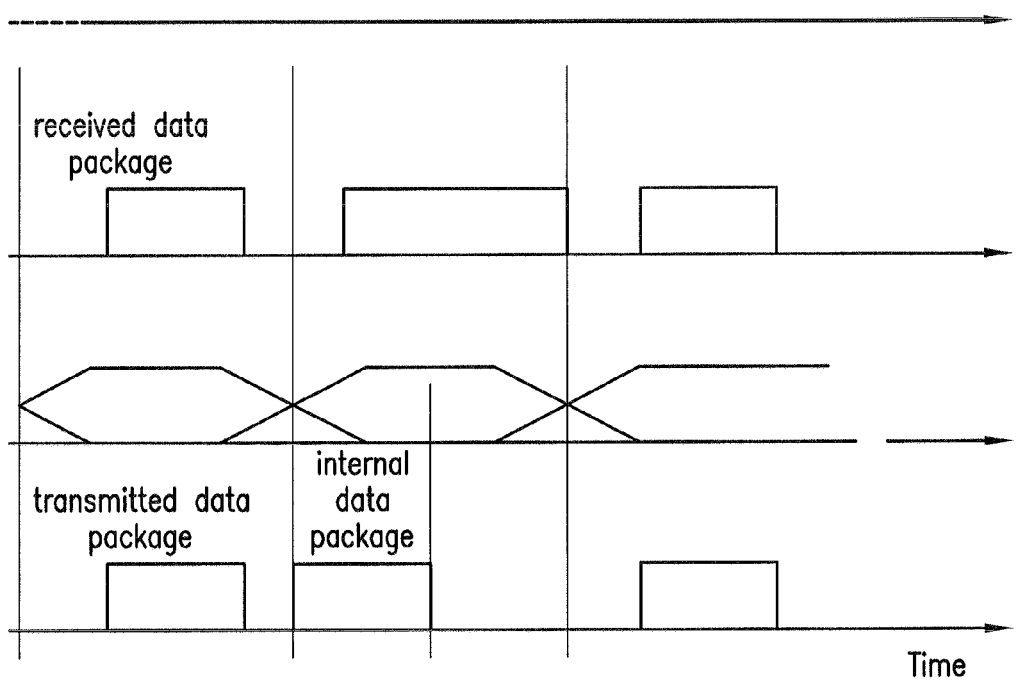
FIG. 4 is a data packet timing diagram during the active phase of an IP communication channel.

FIG. 4 shows a timing diagram of a sequence of data packets during the time that an IP communication channel is active, when the network station 10 is to transmit an internal data packet. In the first part, it is clear that the repeater amplifies the received data packet and transmits it via the data output interface 12. If an internal data packet is then to be transmitted, then first a test is run to make sure that an external data packet is not currently being received via the data input interface 11. If not, then, as shown in the second part of the diagram in FIG. 4, the internal data packet is transmitted. After the transmission of the internal data packet has finished, if it is determined that the data input interface is currently receiving an external data packet, then this is not transmitted to the data output interface 12 until the reception of this external data packet has finished and only then, as shown in the third part of FIG. 4, is a subsequently received external data packet forwarded to the next network station via the data output interface 12.

It will be understood that each of the elements described above, or two or more together, may also find a useful application in other types of constructions differing from the types described above.

While the invention has been illustrated and described as embodied in a main station and substation in a network and a method for transmitting data in a network, it is not intended to be limited to the details shown, since various modifications and structural changes may be made without departing in any way from the spirit of the present invention.

Without further analysis, the foregoing will reveal fully revela the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims.

The invention claimed is:

1. A network station for a data network for receiving external data and for transmitting device-internally prepared data, comprising:

a repeater for transmitting an external data packet received at a data input to a data output;

a first data preparation unit for transmitting an internal data packet generated from the prepared data via the data output;

a switching device for interrupting a data path between the data input and the data output;

a control unit that is connected to the switching device in order, in a first operating mode, to block the transmission of the received external data packet via the data output if the internal data packet is currently being transmitted via the data output by the data preparation unit, and to permit the transmission of the received data packet by the repeater via the data output if no internal data packet is currently being transmitted via the first data preparation unit, wherein the control unit is configured so that it functions cyclically, in the first operating mode during a first time interval and in a second operating mode during a second time interval; further comprising a second data preparation unit for transmitting the prepared data; and the control unit is connected to the switching device in order, in the second operating mode, to connect the data output to the repeater and the second data preparation unit in alternating fashion so that a part of a particular data packet received at the data input is transmitted by the repeater to the data output and so that the prepared data are inserted into the data packet at a chronologically defined position of a defined data packet.

2. The network station as defined in claim 1, wherein the control unit is configured to control the switching device so that in the first operating mode, the transmission of the received external data packet by the repeater via the data output is blocked until the received external data packet has finished arriving.

3. The network station as defined in claim 1; further comprising a test data unit provided in order, at least in the second operating mode, to obtain the received external data packet from the data input and the prepared internal data from the second data preparation unit and to generate a test datum; and the control unit is configured so that it triggers the switching device so that the test datum is added to the received external data packet at another chronologically defined position of the received external data packet.

4. A method for receiving external data packets and for transmitting device-internally prepared data in a data network, comprising the steps defining a first operating mode which include:

transmitting of a received external data packet to a data output;

preparing an internal data packet that includes the device-internally prepared data;

transmitting the prepared internal data packet via the data output;

blocking the transmitting of a data packet received from the data network to the data output if the prepared internal data packet is currently being transmitted to the data network;

comprising during a first time interval, adopting the first operating mode and during a second time interval, adopting a second operating mode by a system, wherein the second operating mode includes the steps of preparing transmitting data; transmitting a part of a definite received external data packet via the data network; and inserting the prepared internal data into the defined data packet at a chronologically defined position.

5. The method as defined in claim 4; further comprising blocking the transmitting of the received external data packet to the data network until the received external data packet has finished arriving.

6. The method as defined in claim 4; further comprising including in the second operating mode also additional steps of establishing a test datum based on the defined received external data packet and the prepared internal data, and inserting the test datum into the definite received external data packet at another chronologically defined position.

\* \* \* \* \*